United States Patent [19]

Asano et al.

[11] 3,745,660

[45] July 17, 1973

[54] MEASURING APPARATUS
[75] Inventors: Hiroaki Asano, Kariya; Hiroshi Kobayashi, Anjo, both of Japan
[73] Assignee: Toyoda Koki Kabushiki Kaisha, Kariya-shi, Japan
[22] Filed: Aug. 13, 1971
[21] Appl. No.: 171,626

[30] Foreign Application Priority Data
Sept. 21, 1970 Japan.............................. 45/83075

[52] U.S. Cl. ............ 33/143 R, 33/178 R, 33/147 E
[51] Int. Cl........................... G01b 5/08, G01b 5/10
[58] Field of Search..................... 51/165; 33/143 R, 33/143 L, 143 M, 147 E, 147 R, 147 L, 147 T, 147 N, 147 J, 148 H, 148 R, 149 J, 149 R, 178 E, 178 R, 174 M

[56] References Cited
UNITED STATES PATENTS
3,226,833  1/1966  Lemelson............................ 33/171
3,210,853 10/1965  Wiatt ................................. 33/143 R
3,568,372  3/1971  Asano et al....................... 51/165 R Primary Examiner—Harry N. Haroian
Attorney—Norman F. Oblon et al.

[57] ABSTRACT

Measuring apparatus for measuring the diameter of a workpiece over an extended range thereof being provided with first and second feelers adapted to engage the workpiece and respectively being mounted on first and second hold blocks. To achieve a high measuring accuracy, the spacing between the first and second hold blocks is controlled by a single threaded portion only formed on a motor-driven feed shaft, the shaft being rotatably supported in the first of the hold blocks but threadedly engaging a support thereof for causing the first hold block to move in one direction and being threadedly engaged with the second of the hold blocks for causing it to move in an opposite direction by twice as far upon rotation thereof by the driving motor therefor.

7 Claims, 5 Drawing Figures

MEASURING APPARATUS

BACKGROUND OF THE INVENTION

The present invention relates generally to measuring apparatus, and more particularly concerns an improved measuring apparatus for use with a grinding machine for accurately monitoring the grinding of a workpiece to a predetermined diameter and automatically adaptable for measuring workpiece diameters different from the predetermined diameter in subsequent grinding operations of other workpieces.

In accurately machining a workpiece to a predetermined diameter with a tool, such as, for example, a grinding wheel, it is necessary to continuously measure the diameter of the workpiece during the machining or grinding operation. For this purpose, a measuring apparatus is employed, generally being provided with a pair of spaced feelers adapted to engage the periphery of the workpiece. Whenever a workpiece is to be ground to a certain diameter which is different from that of the workpiece in the previous grinding operation, it is therefore necessary to change the preset spacing of the measuring apparatus feelers.

In a conventional measuring device of the character described, a stationary feeler and a pivotable feeler are provided being supported on respective hold blocks and the distance therebetween is manually adjusted using a master gauge or a piece which has been accurately finished to a a spacing corresponding to the desired diameter. The feelers are then fixed in this preset spaced relation to a measuring head through the supporting hold blocks which are securely mounted thereon. The one feeler is pivotally mounted on its hold block with one end thereof being operably connected to a displacement detector, such as, for example, a differential transformer, for detecting motion of the other end thereof occurring through the change being effected in the workpiece diameter by the grinding operation.

In such a conventional measuring device, however, since the feeler hold blocks are fixedly secured to the measuring head after the adjustment of the distance between the feelers has been made, it is impossible to automatically change the spacing of the feelers in accordance with the selection of a new diameter for a different workpiece to be subsequently ground. In other words, whenever a workpiece requires a certain diameter which is different from the diameter of a previous workpiece, the same manual adjusting procedure for changing the distance between the feelers must be performed. This readjustment of the spacing of the feelers is laborious and effectively reduces the versatility of the measuring apparatus.

Consequently, a measuring apparatus wherein a manual readjustment is not necessary for measuring different workpiece diameters has recently been developed. Thus, an adjustment is performed by sliding a pair of feelers along pilot bars toward and away from each other with respect to the center of the workpiece to be measured so as to vary the distance between the feelers according to the change of the diameter to be obtained on a workpiece. For this purpose, a feed shaft is provided with lefthand and righthand thread portions at the ends thereof and the two feeler hold blocks threadably engage these threaded portions, such that the feelers may be moved toward and away from each other when the feed shaft is rotated, as for example, by a pulse motor. Thus, the distance between the feelers may be automatically changed to another value in accordance with the workpiece diameter being ground.

This arrangement, however, also involves several problems which reduce the measuring accuracy. For example, the inaccuracy resulting in the feeler spacing because of the errors of the pitches of the lefthand and righthand threads is doubled thereby. Also, backlash between the hold blocks and the pilot bars and any non-linearities of the pilot bars cause the feelers to be inclined. Further, the heat being generated by the pulse motor is undesirably transmitted to the feed shaft and to other components of the measuring apparatus. All of these factors, of course, are operative singly and in unison to greatly affect the accuracy of the measuring operation.

SUMMARY OF THE INVENTION

Accordingly, it is an object of the present invention to provide an improved measuring apparatus for use with a grinding machine for automatically presetting a pair of workpiece diameter-measuring feelers a preselected distance apart.

Another object of the present invention is the provision of an improved measuring apparatus of the character described for automatically adjusting the spacing between a pair of measuring feelers securably carried by a measuring head for monitoring the diameter of a workpiece being ground by a grinding machine.

Still another object of the present invention is the provision of an improved measuring apparatus for automatically adjusting the spacing of a pair of workpiece diameter-measuring feelers for monitoring the grinding of a workpiece in a grinding machine to a diameter corresponding to the feeler spacing which is characterized by its high degree of accuracy.

The foregoing and other objects are attained according to this invention by an apparatus featuring a first block slidably mounted on a main body of a grinding machine, a second block slidably mounted on the first block, feeler measuring members respectively carried by the slidable blocks, a feed shaft rotatably supported in the first block and having a threaded portion engaging the main body and another threaded portion engaging the second block, the pitch of the second block-engaging threaded portion being twice as large as the pitch of the main body-engaging threaded portion, whereby the distance between the feeler measuring members is controlled through the rotation of the feed shaft by only one threaded portion thereon.

BRIEF DESCRIPTION OF THE DRAWINGS

Various other objects, features and attendant advantages of the present invention will be more fully appreciated as the same becomes better understood from the following description of a preferred embodiment when considered in connection with the accompanying drawings wherein like reference numerals designate like or corresponding parts throughout the several views and in which.

DESCRIPTION OF A PREFERRED EMBODIMENT

Figure 1:
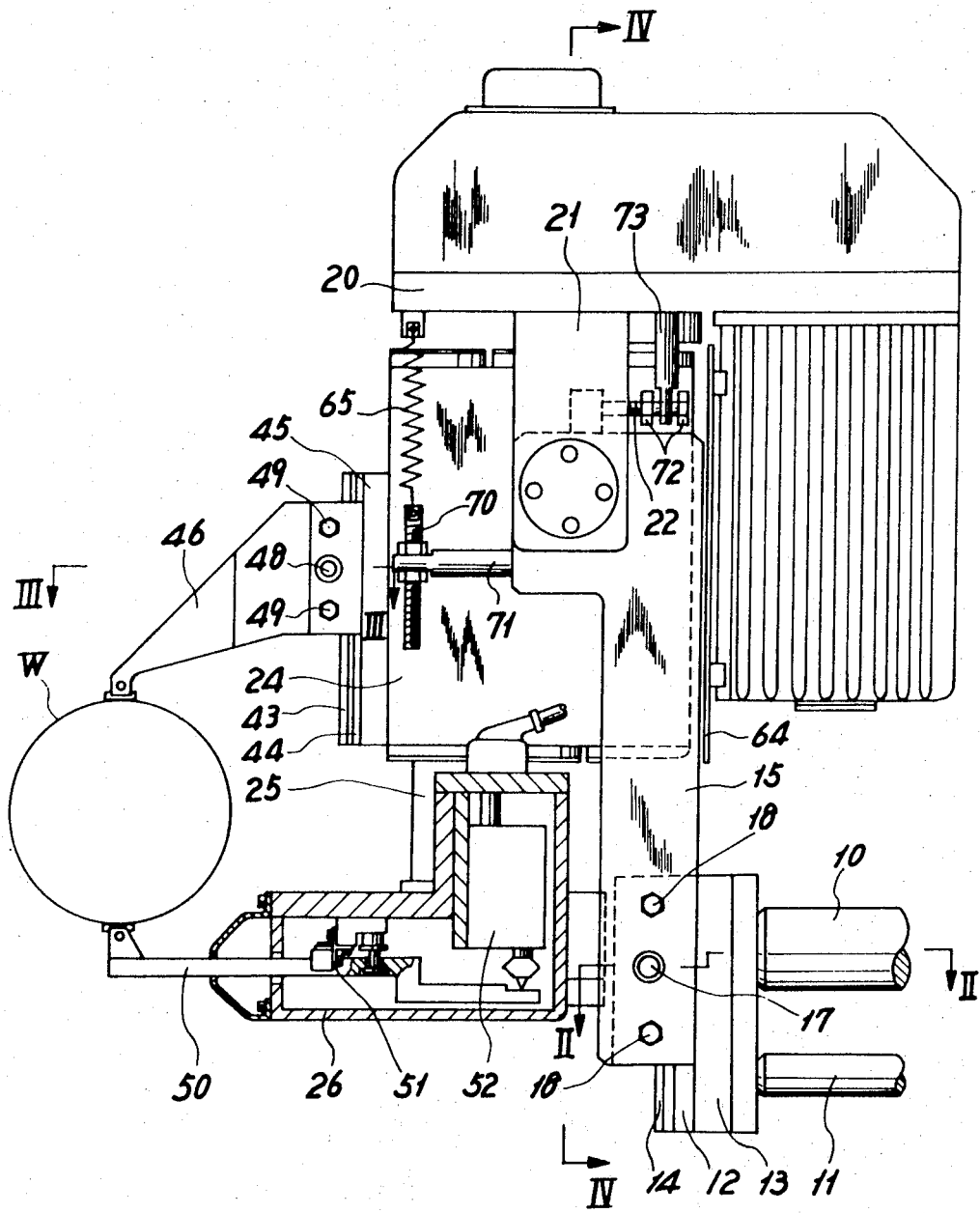
FIG. 1 is a side view of a wide range workpiece diameter-measuring apparatus constructed according to the present invention.
Figure 2:
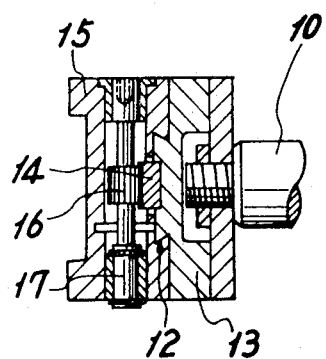
FIG. 2 is a sectional view taken along the line II—II in FIG. 1.

Referring now to FIG. 1, there is shown a workpiece diameter-measuring apparatus in which a guide support 13 is connected for being horizontally moved by a guide rod 10 and a piston rod 11 of a conventional hydraulic actuator. A dovetail 12 and a rack 14 are vertically oriented on the front surface of the guide support 13, and a bifurcate bracket 15 having a dovetail groove engages the dovetail 12 on the guide support 13. As will be apparent from FIG. 2, an adjustment shaft 17 having a pinion 16 meshing with the rack 14 is rotatably supported in the bracket 15. Therefore, the vertical disposition of the bracket 15 is adjustable by rotation of the shaft 17. Screws 18 are screwed into the bracket 15 for clamping it onto the guide support 13.

Figure 4:
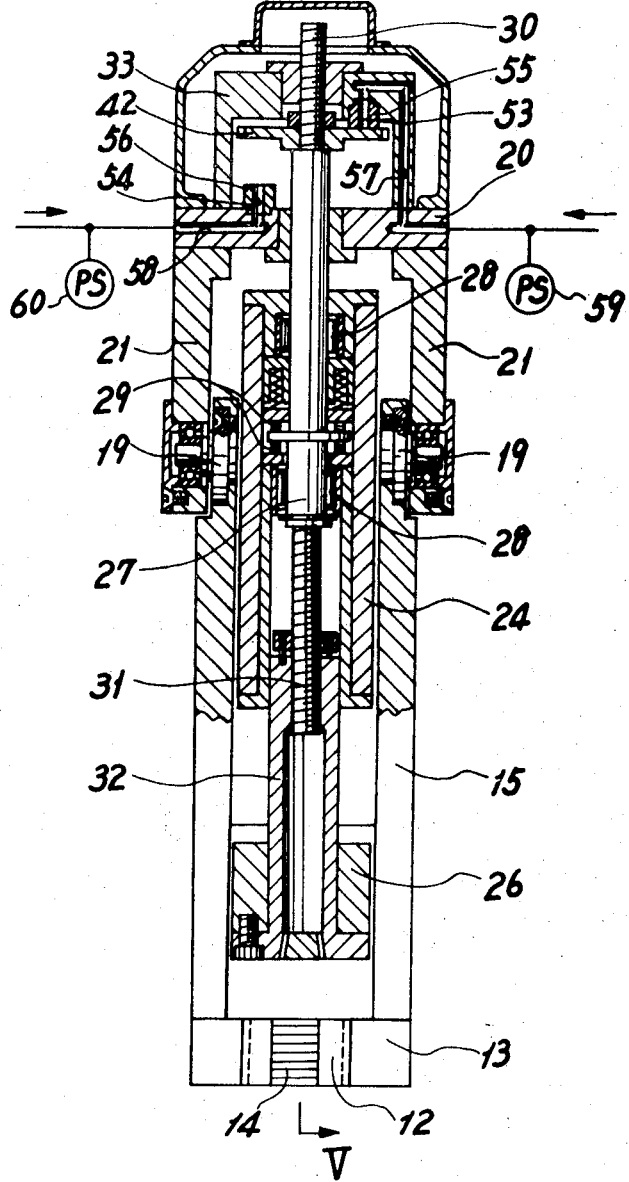
FIG. 4 is a longitudinal sectional view taken along the line IV—IV in FIG. 1.

In FIG. 4, horizontally disposed pivots 19 are shown being secured to the upper ends of the bifurcate bracket 15, and arms 21 secured to the lower side of a main body 20 are shown being pivotally mounted on the pivots 19 through suitable bearings. A tension spring 65, seen in FIG. 1, is provided between a screw 70 engaging a front projection 71 of the bracket 15 and the front lower end of the main body 20, to thereby provide a weight balance for the main body 20 and other components, as will be set forth hereinbelow. Abutments 72 are fixed on a bolt 22 carried on the top of bracket 15, and a stop 73 attached on the lower surface of the main body 20 extends between the abutments 72 to limit the swing of the main body 20.

Figure 5:
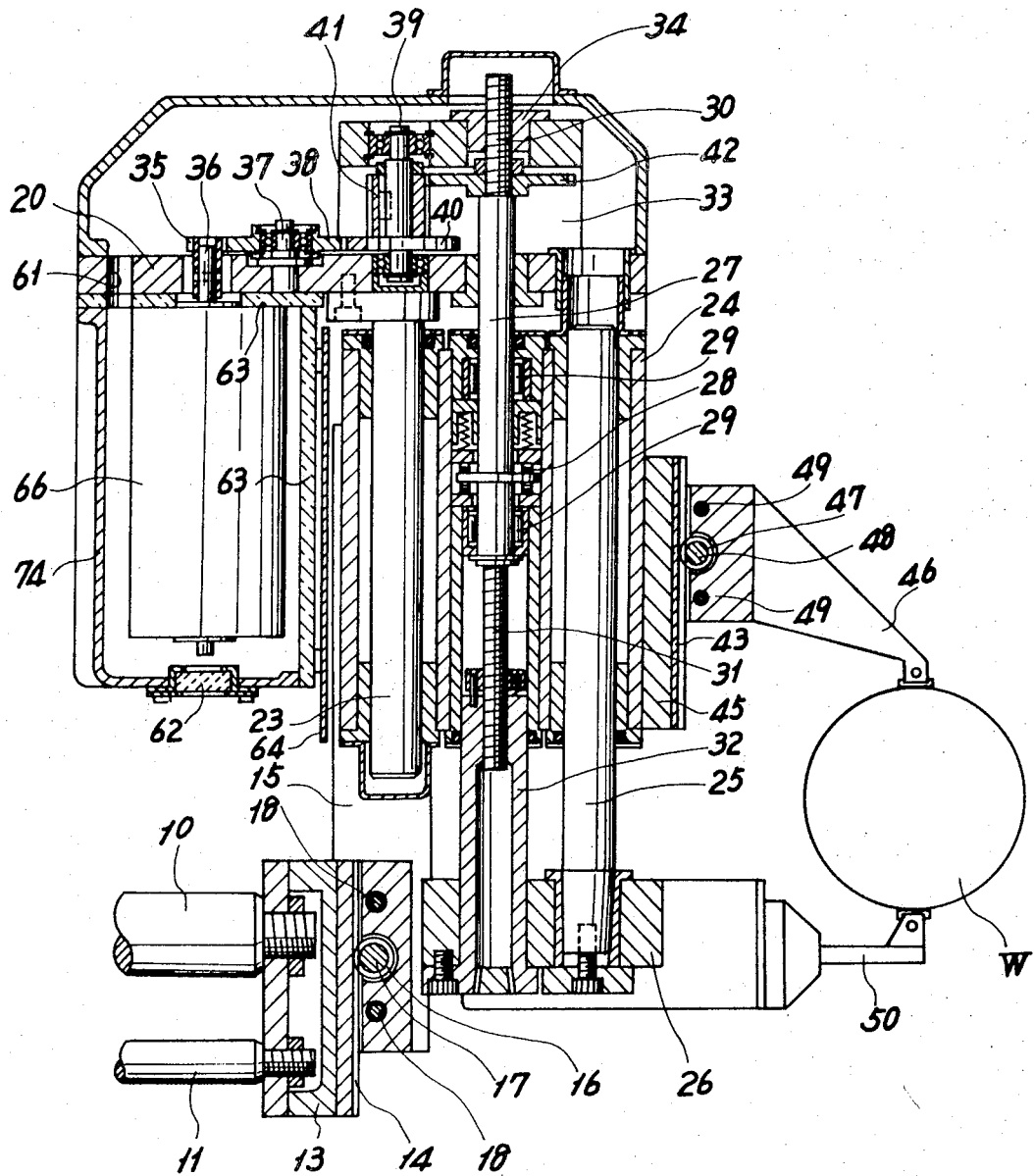
FIG. 5 is a vertical sectional view taken along the line V—V in FIG. 4.

As shown in FIG. 5, a first vertical pilot bar 23 is secured to the main body 20 and has an upper block 24 slidably mounted thereon. A second pilot bar 25 is slidably supported in the upper block 24 in a path parallel to the first pilot bar 23, and a lower block 26 is fixed to the lower end of the second pilot bar 25 projecting from below the upper block 24. Therefore, the precision of the relative movement of the upper block 24 and the lower block 26 is dependent only upon the accuracy of the second pilot bar 25.

Moreover, a feed shaft 27 is rotatably supported in the upper block 24 parallel with the first pilot bar 23 and the second pilot bar 25 by means of thrust bearings 28 and needle bearings 29. Righthand threads 30 are provided on the upper portion of the feed shaft 27, and on the lower portion thereof, similar righthand threads 31 but having a pitch twice as large as that of the righthand threads 30 are provided. The righthand threads 31 mesh with a lower feed nut 32 secured to the lower block 26, and the right-hand threads 30 mesh with an upper feed nut 34 secured to a stand 33 carried on the main body 20.

A gear 35 is carried on a rotary shaft 36 of a pulse motor 66 secured to one side of the main body 20. The gear 35 meshes with a gear 38 rotatably mounted on an intermediate shaft 37 fixed to the main body 20. Another gear 40 mounted on a rotary shaft 39 rotatably journalled by suitable bearings respectively disposed in the main body 20 and the stand 33 meshes with the gear 38. Keyed to the rotary shaft 39 is a gear 41 of relatively wide dimension which meshingly engages a gear 42 fixed to the feed shaft 27 near one end thereof. Thus, the rotation of the rotary shaft 36 of pulse motor 66 may be transmitted to the feed shaft 27 through gears 35, 38, 40 and 42. When the feed shaft 27 is caused to rotate clockwise, as viewed from the top, the upper block 24 will be moved downwardly along the first pilot bar 23 because of the engagement of the righthand threads 30 and the upper feed nut 34, and the lower block 26 will be raised together with the pilot bar 25 by an amount equal to the downward movement of upper block 24 because of engagement of the righthand threads 31 and the lower feed nut 32.

Conversely, when the feed shaft 27 is rotated in a counterclockwise direction, the upper block 24 is raised and the lower block 26 descends. Therefore the precision of the relative distance between the upper block 24 and the lower block 26 is dependent only upon the accuracy of the pitch of righthand threads 31 and not of righthand threads 30.

Figure 3:
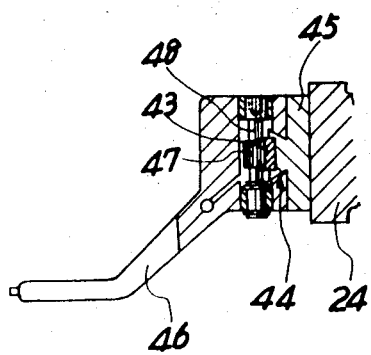
FIG. 3 is a sectional view taken along the line III—III in FIG. 1.

As shown in FIGS. 3 and 5, a plate 45 provided with a rack 43 and a dovetail 44 is secured to the upper block 24. A stationary measuring member, or feeler, 46 is provided with a dovetail groove which receives the dovetail 44 of the plate 45. An adjustment rod 48 having a pinion 47 meshing with the rack 43 is rotatably supported on the stationary measuring member 46, so that the vertical disposition of the stationary measuring member 46 along the plate 45 can be adjusted by rotating the adjustment rod 48. Screws 49 clamp the stationary measuring member 46 onto the plate 45.

Referring again to FIG. 1, a movably measuring member, or feeler, 50 is tiltably mounted on the lower block 26 by means of crossed leaf springs 51. The inner end of the measuring member 50 is maintained in contact with a differential transformer 52 mounted on the lower block 26 to detect any displacement of the movable measuring member 50.

As shown in FIG. 4, elastic members 55 and 56 having respective jet ports 53 and 54 confronting opposite sides of the gear 42 are secured to the stand 33 and the main body 20, respectively. The jet ports 53 and 54 are respectively connected with conduits 57 and 58 supplied with pressurized air from a suitable source, not shown. Pressure switches 59 and 60 are respectively connected to the conduits 57 and 58 such that, when the gear 42 shuts the jet port 53, the pressure switch 59 detects the uppermost movement of the feed shaft 27 to prevent its overrun. Similarly, when the gear 42 shuts the jet port 54, the pressure switch 60 detects the lowermost movement of the feed shaft 27. The pressurized air jetting constantly from the jet ports 53 and 54 passes through the interior of the main body 20 and an opening 61, shown in FIG. 5, and flows around the exterior of the pulse motor 66, an thereafter exhausts to the atmosphere through a filter 62 secured to a casing 74 carried on the main body 20 and covering the pulse motor 66. Thus, the air is forced to circulate around the pulse motor 66 and the temperature near the feed shaft 27 is accordingly preserved properly, whereby the measuring accuracy is maintained regardless of heat being generated by the pulse motor 66. Heat insulators 63 and a reflector 64 fixed between the pulse motor 66 and the main body 20 further serve to prevent the heat being transmitted from the pulse motor 66 to the feed shaft 27 and other components.

The measuring apparatus of this invention constructed in the manner described herein operates in the following manner. Initially, it is necessary to accurately align the operating point of the differential transformer 52 at which a signal representing the desired workpiece diameter is to be generated with a reference point or the origin. This alignment is performed by using a master gauge or special piece. More particularly, the master piece which has been accurately finished to have the precise outer diameter desired is interposed between the pair of measuring members. The vertical position of the whole apparatus is adjusted relative to the guide support 13, as mentioned above, and that of the stationary measuring member 46 is adjusted relative to the plate 45, so that the measuring members may engage the outer peripheral surface of the master piece with a light pressure. Under these conditions, the operating point of the differential transformer 52 is adjusted to provide an electric signal representing the dimension of the diameter of the master piece. Taking the nominal diameter of the master piece as the reference, a pulse signal corresponding to the difference between this reference and a preselected dimension is applied to the pulse motor 66 to drive the feed shaft 27 through the gear train described hereinbefore. For the sake of description, it is assumed that the rotary shaft 36 of the pulse motor 66 is rotated in the counterclockwise direction when viewed from the upper portion in FIG. 5, so that the feed shaft 27 is rotated in the clockwise direction through the gear train so as to move the feed shaft 27 itself downwardly. As a result the upper block 24 is moved downwardly along the first pilot bar 23. Thus the stationary measuring member 46 is moved downwardly through a distance corresponding to the number of pulse signals applied to the pulse motor 66. Further, as described above, since the pitch of the righthand threads 31 of the feed shaft 27 is twice as large as that of the righthand threads 30, the lower block 26 moves upwardly with the movable measuring member 50 over a distance twice as great as that of the movement of the stationary measuring member 46. Thus it is possible to vary the spacing between a pair of measuring feeler members as well as the operating point of the measuring apparatus without changing the position of the center of the spacing between the pair of measuring members. Subsequent to this setting, when the dimension of the workpiece reaches the selected value, an output from the differential transformer provides a signal through a comparator circuit, not shown in the drawing, which shows that the workpiece has a diameter of the predetermined dimension.

While the invention has been shown and described in terms of a preferred embodiment thereof, it is obvious that many variation and modifications will be readily apparent to one skilled in the art without departing from the true spirit and scope of the invention. Accordingly, it is to be understood that within the scope of the appended claims, the invention may be practiced otherwise than as specifically described herein.

What is claimed as new and desired to be secured by Letters Patent of the United States is:

1. In a wide range dimension measuring apparatus comprising:
   a bracket;
   a main body pivotally mounted on said bracket;
   a first block slidably mounted on said main body;
   a first measuring member carried on said first block;
   a second block slidably mounted on said first block;
   a second measuring member carried on said second block;
   a feed shaft rotatably supported in said first block, said feed shaft having first means for moving said first block and second means for moving said second block relative to said first block in a direction opposite to the movement of said first block and in an amount twice that of the movement of said first block; and
   means to rotate said feed shaft.

2. In a workpiece diameter-measuring apparatus comprising:
   a main support body;
   a first pilot bar secured to said main support body;
   a first block slidably mounted on said first pilot bar;
   a first measuring member carried on said first block;
   a second pilot bar slidably mounted on said first block;
   a second block secured to said second pilot bar;
   a second measuring member carried on said second block;
   a feed shaft rotatably supported in said first block, said feed shaft having a first threaded portion engaging said main support body and a second threaded portion engaging said second block, the pitch of said second threaded portion being twice as large as that of said first threaded portion; and
   means for rotating said feed shaft.

3. A workpiece diameter-measuring apparatus as set forth in claim 2 in which the second measuring member is pivotally carried by said second block, and further comprising a displacement detector associated with said second measuring member.

4. A workpiece diameter-measuring apparatus as set forth in claim 2 wherein said means for rotating said feed shaft comprises:
   a pulse motor secured to said main support body;
   a first gear mounted on said feed shaft;
   a second gear mounted on the shaft of said pulse motor; and
   gear train means interconnecting said first gear and said second gear.

5. A workpiece diameter-measuring apparatus as set forth in claim 4, further comprising air jet means for supplying pressurized air about the exterior of said pulse motor.

6. A workpiece diameter-measuring apparatus as set forth in claim 4, further comprising:
   a first jet port confronting one side of said first gear;
   a pressure detector connected with said first jet port;
   a second jet port confronting the other side of said first gear; and
   a pressure detector connected with said second jet port.

7. A workpiece diameter-measuring apparatus as set forth in claim 2 wherein said first and second threaded portions are threaded in the same direction, whereby said second block is movable with said first block in an opposite direction and twice the distance of movement upon rotation of said feed shaft.

* * * * *